United States Patent Office.

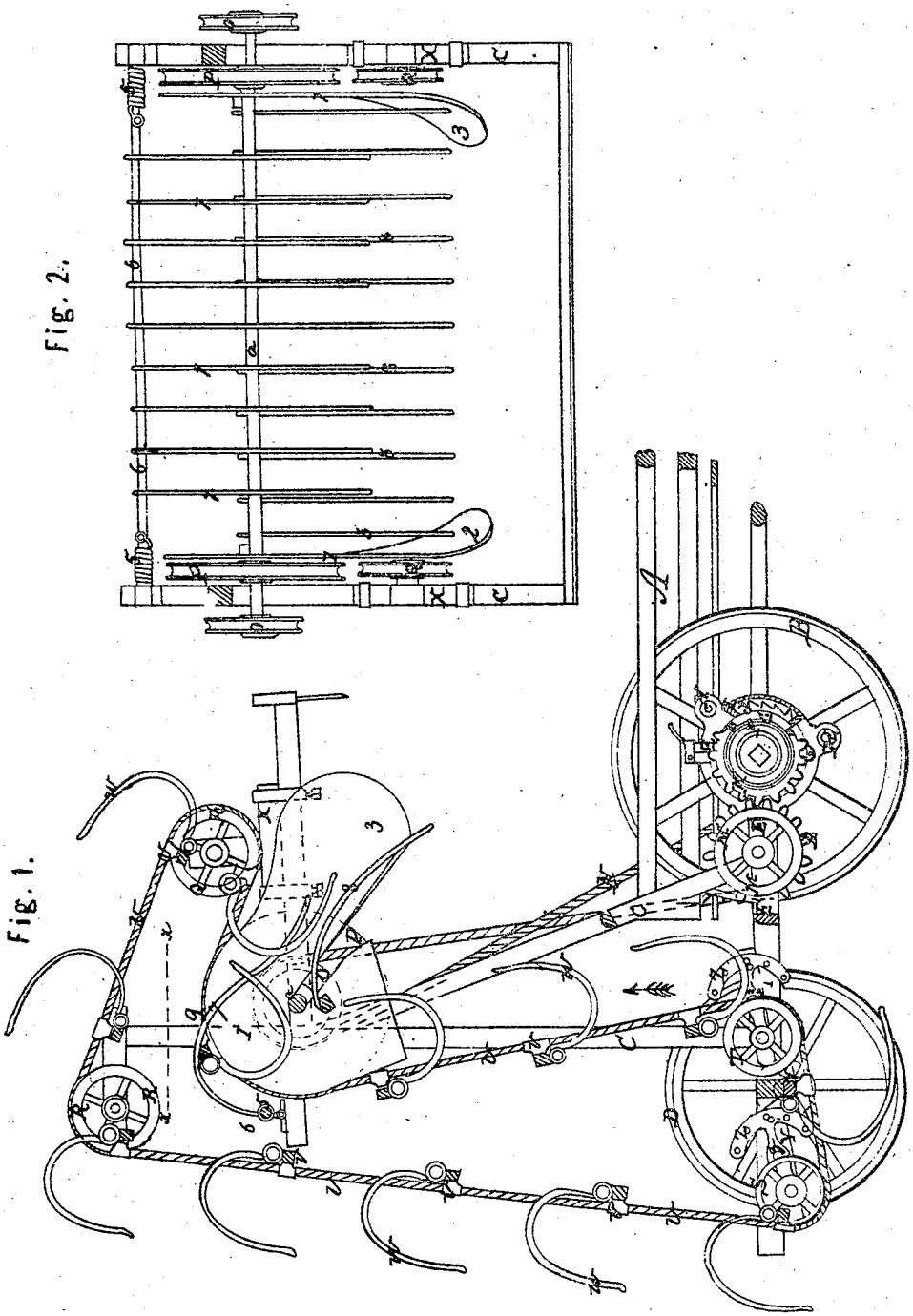

MILO WEBB, OF CHENANGO FORKS, NEW YORK.

Letters Patent No. 68,587, dated September 3, 1867.

IMPROVEMENT IN HAY-RAKERS AND LOADERS.

*The Schedule referred to in these Letters Patent and making part of the same.*

TO ALL WHOM IT MAY CONCERN:

Be it known that I, MILO WEBB, of Chenango Forks, in the county of Broome, and State of New York, have invented a new and useful Improvement in Hay-Loaders; and I do hereby declare the following to be a full, clear, and exact description of the same, reference being had to the accompanying drawings, which are made part of this specification.

This invention relates to a hay-loading device or apparatus, capable of attachment to any ordinary farm-wagon, and having provisions for the effective and certain delivery of the entire cut of hay without liability to leave portions thereof behind upon the field, or to scatter the same in the act of loading.

Figure 1 represents a side elevation of the rear part of a wagon, and a vertical section of my loading attachment.

Figure 2 is a horizontal section of a portion of the loading attachment at x x, fig. 1.

A represents the rear portion of a common farm-wagon. B is one of its hind wheels. The loading attachment comprises a light frame, C, mounted on wheels, D, terminated in front in a yoke, E, which embraces a thimble, F, which itself partially encircles, and is partially enclosed by a sleeve, G, secured to the wheel by a series of clips, H, encircling the spokes, or by other suitable fastening. A pawl, I, and ratchet, J, upon the sleeve and thimble respectively, insure the rotation of the latter with each forward movement of the wheel D, but allow the thimble to remain inactive, with a merely retrograde movement thereof. Each thimble is armed with a spur-wheel, K, which gears to a corresponding wheel, L, carrying a pulley, M, from which a belt, N, is crossed upward and slightly rearward to a pulley, O, whose shaft o carries another and larger pulley, P, around which and certain other pulleys, Q R S T, on each respective side of the frame, are stretched the endless cords or belts U, to which are attached the heads V, of a series of rakes, V W. The shaft of the pulley Q is mounted on a carrier, X, capable of being slid forward along the frame, and tightened by a set-screw, so as to bring and hold the belt to any degree of tightness. The two lower pulleys, S T, are journalled in a rocking-beam, Y, which enables the, for the time being, lowermost rakes to lightly rest or "float" upon the ground surface, without either tearing up the roots or leaving a portion of the crop ungathered. The journal-bearing o of one or both pulleys S T, has brackets, Z, pivoted, z, to the rocking-beam, and capable of being let down or up, so as to cause the pulleys S T to be nearer to or further from the ground, at the discretion of the operator. Attached to the frame, on the inner side of each large pulley P, is a guard and director, 1, having downwardly-projecting wings or prolongations, 2 3, of which the wing 2 serves to detach any portion of hay that might otherwise become entangled with the cord, and of which the wing 3, being bent slightly inward, seaves to gather the hay towards the centre, and to prevent its scattering over the sides of the wagon-bed. Journalled, 4, and attached by a third spring, 5, to the rear portion of the frame, is a shaft, 6, carrying a series of curved fingers, 7, which, as each rake in turn approaches its position of delivery, (see fig. 1,) acts to clear off and empty the same. 8 is a series of fingers whose office it is to conduct the hay on to the bed of the wagon.

The operation is as follows: The wagon being drawn forward over the field, each rake in succession (see arrow) takes up its modicum of hay, and carrying it upward to the point 9, begins a forward and slightly downward motion, and at this junction the tines of the clearing-rake, falling down between those of the elevating-rake in question, clear off its entire load of hay as it advances, and dropping it upon the conducting-fingers 8, is by them, and by the directing-boards 1, conducted to the wagon-bed.

Having thus described my invention, what I claim as new, and desire to secure by Letters Patent, is—

1. The arrangement of pulleys M O Q R S T, endless cords U, and rakes V W, in the described combination with the clearing-fingers or rake 7, as set forth.

2. The combination of the endless series of rakes W, the guards or directors 1, and conducting-fingers 8, all constructed and arranged substantially as and for the purposes set forth.

3. The combination, with an endless series of rakes, of the rocking-beam Y, for enabling the bottom rake to skim without tearing up the ground, in the manner set forth.

4. I claim the adjustable bracketed bearings Z, in combination with the rocking-beam Y, for the purpose explained.

5. The combination of the pulley Q and carrier X with the endless rakes, to tighten them as described.

MILO WEBB.

Witnesses:
WARREN M. ELLS.
C. B. MILLER.